United States Patent [19]

Hirano et al.

[11] Patent Number: 4,967,383

[45] Date of Patent: Oct. 30, 1990

[54] OPERATIONAL CONDITION SETTING DEVICE FOR COMBINATION WEIGHING MACHINE

[75] Inventors: Takashi Hirano, Kobe; Michio Taguchi, Tatsuno; Kazuhiro Nishide, Kobe, all of Japan

[73] Assignee: Yamato Scale Company, Limited, Akashi, Japan

[21] Appl. No.: 214,688

[22] Filed: Jul. 1, 1988

[30] Foreign Application Priority Data

Jul. 8, 1987 [JP] Japan ................... 62-170756

[51] Int. Cl.$^5$ ........................... G01G 19/04
[52] U.S. Cl. ................... 364/567; 364/550; 177/25.15
[58] Field of Search ........... 364/567, 466, 138, 469, 364/468, 550; 177/125.18

[56] References Cited

U.S. PATENT DOCUMENTS

| | | | |
|---|---|---|---|
| 4,212,074 | 7/1980 | Kuno et al. | 364/466 |
| 4,553,616 | 11/1985 | Haze | 177/25.18 |
| 4,673,046 | 6/1987 | Matsuura | 177/25.18 |
| 4,811,256 | 3/1989 | Yamada et al. | 364/567 |

FOREIGN PATENT DOCUMENTS 0046517  3/1984  Japan ................... 177/25.18

OTHER PUBLICATIONS

Japanese patent opening gazette No. 62-103524.

Primary Examiner—Parshotam S. Lall
Assistant Examiner—Michael Zanelli
Attorney, Agent, or Firm—Senniger, Powers, Leavitt & Roedel

[57] ABSTRACT

A device for setting various operational parameters of combination weighing machine, such as target weight, speed of operation, name of product, allowable range of weight, hopper gate opening time and feed conveyor operation time. In this device, it is only necessary to manually register some independent operational parameters such as target weight and speed of operation from a keyboard and, then, the remaining dependent operational parameters such as hopper gate opening time and conveyor operation time can be registered automatically in accordance with the previously registered independent operational parameters.

16 Claims, 8 Drawing Sheets

OPERATIONAL CONDITION SETTING DEVICE FOR COMBINATION WEIGHING MACHINE

BACKGROUND OF THE INVENTION

This invention relates to a device for setting operational conditions of respective components included in a combination weighing machine when it is operated.

As shown, for example, in U.S. Pat. No. 4,664,200, a combination weighing machine generally includes a plurality of weigh hoppers, a plurality of feed hoppers for feeding product to the weigh hoppers, a plurality of feed conveyers for feeding product to the feed hoppers, a collection chute for collecting a batch of product discharged from some of the weigh hoppers for delivery to a packing machine, and a control unit for controlling these components.

The control unit is adapted to execute a combination operation for combining weight signals from the weigh hoppers in various fashions, calculating total weights of these combinations and selecting a combination having a total weight equal or nearest to a predetermined target weight within a predetermined allowable range of weight, and a discharge operation for discharging product from those weigh hoppers relating to the selected combination to a collection chute for delivery to the packing machine. The control unit also executes a feed operation for feeding product to the emptied weigh hoppers from corresponding feed hoppers and then operating corresponding feed conveyers to feed product to the emptied feed hoppers. The control unit repeats these operations in a predetermined time sequence at a preset frequency to successively deliver batches of product to the packing machine.

For operating such a combination weighing machine, it is necessary to previously provide the control unit with various operational conditions or data of operational parameters. The operational parameters include a target weight value and upper and lower limits of an allowable range of weight. They also include a speed of operation indicative of the number of batches of product delivered every minute, vibration amplitude and duration of each feed conveyer determinative of the amount of product fed to the corresponding feed hopper, a feed hopper gate opening time sufficient for discharging the whole content of each feed hopper into the corresponding weigh hopper, a weigh hopper gate opening time sufficient for discharging the whole content of each weigh hopper into the collection chute, and a stabilization time necessary for stabilizing the weight signal from each weigh unit. In the prior art, as described, for example, in the Japanese patent opening gazette No. 62-103524, these data are suitably collected and stored in a memory for every product name or target weight under a specific program number and, before starting operation of the combination weighing machine, they are read out from the memory and set in the control unit by inputting the corresponding program number.

In the prior art device, however, such work of previously collecting and storing the data of many operational parameters for every product name or target weight is very time-consuming and, moreover, it is difficult for unskilled persons since substantial experience is required to select the parameter values suitable for a desired operational condition of the machine.

SUMMARY OF THE INVENTION

Accordingly, an object of this invention is to provide an improved operational condition setting device for a combination weighing machine, which can avoid the above-mentioned problems. This invention has been attained by utilizing such a fact that any operational condition is never set in dependently of the other and, when a datum of one operational condition (hereinunder referred to as "independent operational condition") is determined, some other operational conditions (hereinunder referred to as "dependent operational conditions") can be determined in accordance therewith.

According to this invention, there is provided an operational condition setting device for a combination weighing machine which is operated with preset data of such independent and dependent operational conditions, including means for inputting the data of independent operational condition, means for storing the input data of independent operational condition, and means for setting data of the dependent operational conditions in accordance with the stored data of independent operational condition.

When predetermined data of some independent operational conditions are set in the device of this invention, the data of the dependent operational conditions are automatically set by the dependent operational condition setting means. Therefore, the time needed for setting the operational conditions is substantially shortened and, moreover, the setting operation can be effected easily even by an unskilled operator since only data which he must determine are those of independent operational conditions.

These and other objects and features of this invention will be described in more detail below with reference to the accompanying drawings.

DESCRIPTION OF PREFERRED EMBODIMENTS

Figure 1:
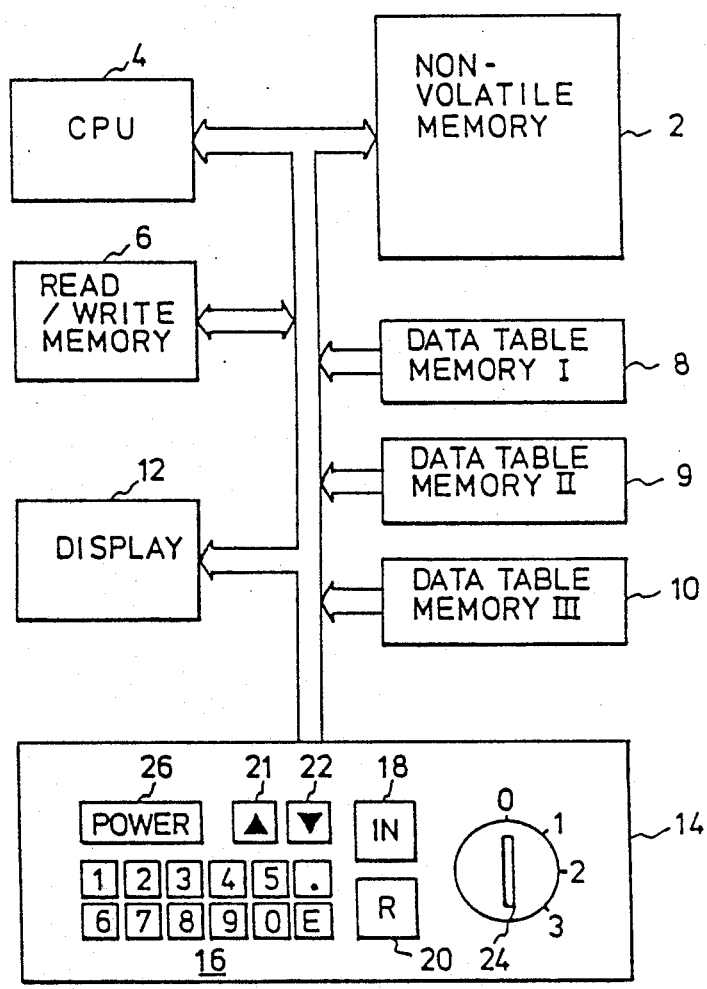
FIG. 1 is a block diagram representing an embodiment of the device according to this invention.

As shown in FIG. 1, the device of this invention includes a non-volatile memory 2 which is previously stored with various operational parameters forming thirty groups, for example, which are adapted to be specified by program numbers of "1" to "30", respectively. The operational parameters stored in the non-volatile memory 2 include, in addition to the program numbers, target weight ($W_T$) of each batch of product delivered from weigher to packer, target number of weigh hoppers which constitute the target weight, speed of operation indicated by the number of batches of product delivered from weigher to packer and determined consistently with the packing power of packer, first upper limit ($W_{max1}$) selected above the target weight for defining a first range of weight therebetween, lower limit ($W_{min}$) selected below the target weight for defining a second range of weight therebetween, second upper limit ($W_{max2}$) selected above the first upper limit for defining a third range of weight therebetween, vibration amplitude and operation time of each electromagnetic vibration conveyer feeder which is determinative of the amount of feed of product, gate opening time of feed and weigh hoppers, weight signal stabilization time required for diminishing weight signal variation after loading weigh hopper, chute passage time spent by the product discharged from weigh hopper for reaching packer, duration of delivery signal applied to packer after the chute passage time for relating to the opening time of delivery gate attached to the outlet of collection chute, nominal unit weight of product, and mode of operation which specifies various automatic operational functions such as automatic amplitude control, automatic zero adjustment and automatic reject disposal.

Other parameters may be used in accordance with the structure of combination weighing machine. For example, when auxiliary hoppers (so-called memory hoppers) are disposed between the weigh hoppers and the collection chute, auxiliary hopper gate opening time must be stored also. Names of product and other information may be stored. While, in this embodiment, the above-mentioned three ranges of weight are defined for selecting combinations in the specified order of preference, it is a matter of course that any other selecting condition is also applicable.

In the following description, the above-mentioned parameters are identified by sequential numbers P (=1,2, ... 19) as shown in Table 1.

TABLE 1

| P | Operational parameter |
|---|---|
| 0 | Target weight ($W_T$) |
| 1 | Speed of operation |
| 2 | Second limie ($W_{max2}$) |
| 3 | Conveyer amplitude |
| 4 | Program number |
| 5 | Nominal unit weight |
| 6 | Name of product |
| 7 | Registration message |
| 8 | Mode of operation |
| 9 | First upper limit ($W_{max1}$) |
| 10 | Lower limit ($W_{min}$) |
| 11 | Conveyer operation time |
| 12 | Feed hopper gate opening time |
| 13 | Weigh hoppr gate opening time |
| 14 | Auxiliary hopper gate opeing time |
| 15 | Weight signal stabilization time |
| 16 | Target number of weigh hoppers |
| 17 | Chute passage time |
| 18 | Delivery signal duration |
| 19 | Final message |

Among the above-listed operational parameters, the hopper gate opening times, weight signal stabilization time and conveyer operation time are fixed if the target weight is fixed, and the target number of weigh hoppers is fixed if the speed of operation is fixed. However, the chute passage time, delivery signal duration, upper and lower limits and mode of operation are fixed regardless of the target weight and speed of operation.

The groups of operational parameters stored in the nonvolatile memory 2 are read out by input program numbers and then written in a read/write memory 6 for use in a central processing unit (CPU) 4. Data or values of these operational parameters are previously stored in three data table memories 8, 9 and 10. The first data table memory 8 stores various values of target weight, gate opening time of each hopper, weight signal stabilization time and conveyer operation time as six groups specified by address numbers AD1 as shown in Table 2 and the second data table memory 9 stores various values of speed of operation and target number of weigh hoppers as four groups specified by address numbers AD2 as shown in Table 3. The third data table memory 10 stores, as shown in Table 4, values of chute passage time, delivery signal duration, lower limit and mode of operation which are common to all the programs regardless of the values of target weight and speed of operation.

TABLE 2

| AD1 | Target weight (gr) | Gate opening time (ms) | | | Weight signal stabilization time (ms) | Conveyer operation time (ms) |
|---|---|---|---|---|---|---|
| | | Weigh | Feed | Aux. | | |
| 1 | 30.0 | 200 | 200 | 250 | 750 | 300 |
| 2 | 50.0 | 200 | 200 | 250 | 800 | 350 |
| 3 | 100.0 | 200 | 200 | 250 | 850 | 400 |
| 4 | 300.0 | 250 | 250 | 300 | 900 | 500 |
| 5 | 500.0 | 250 | 250 | 300 | 950 | 600 |
| 5 | 000.0 | 300 | 300 | 350 | 1000 | 700 |

TABLE 3

| AD2 | Speed of operation (batches/min.) | Target number of weigh hoppers |
|---|---|---|
| 1 | 40.0 | 5.0 |
| 2 | 50.0 | 4.0 |
| 3 | 60.0 | 3.5 |
| 4 | 00.0 | 3.0 |

TABLE 4

| Chute passage time (ms) | Delivery signal duration (ms) | Lower limit (gr) | Mode of operation |
|---|---|---|---|
| 400 | 300 | 0 | 00110011 |

The zero values of target weight and speed of operation in the last address in Tables 2 and 3 are used as reminder of the last data as described later. The mode of operation in Table 4 is given as a binary code.

The device further includes a display unit 12 for displaying operational parameters and values thereof to be preset, as well as messages teaching corresponding setting procedures and input keyboard 14 for effecting parameter setting operation. As shown in the drawing, the keyboard 14 includes numeral keys 16 including a decimal point key (.) and an erase key (E), an input key 18, a return key 20, move keys 21 and 22, a key switch 24 and a power switch 26. It is arranged that an operational condition is set at position 1 of the key switch 24 and the set operational condition is stored in the nonvolatile memory 2 at position 2 thereof.

Figure 2A:
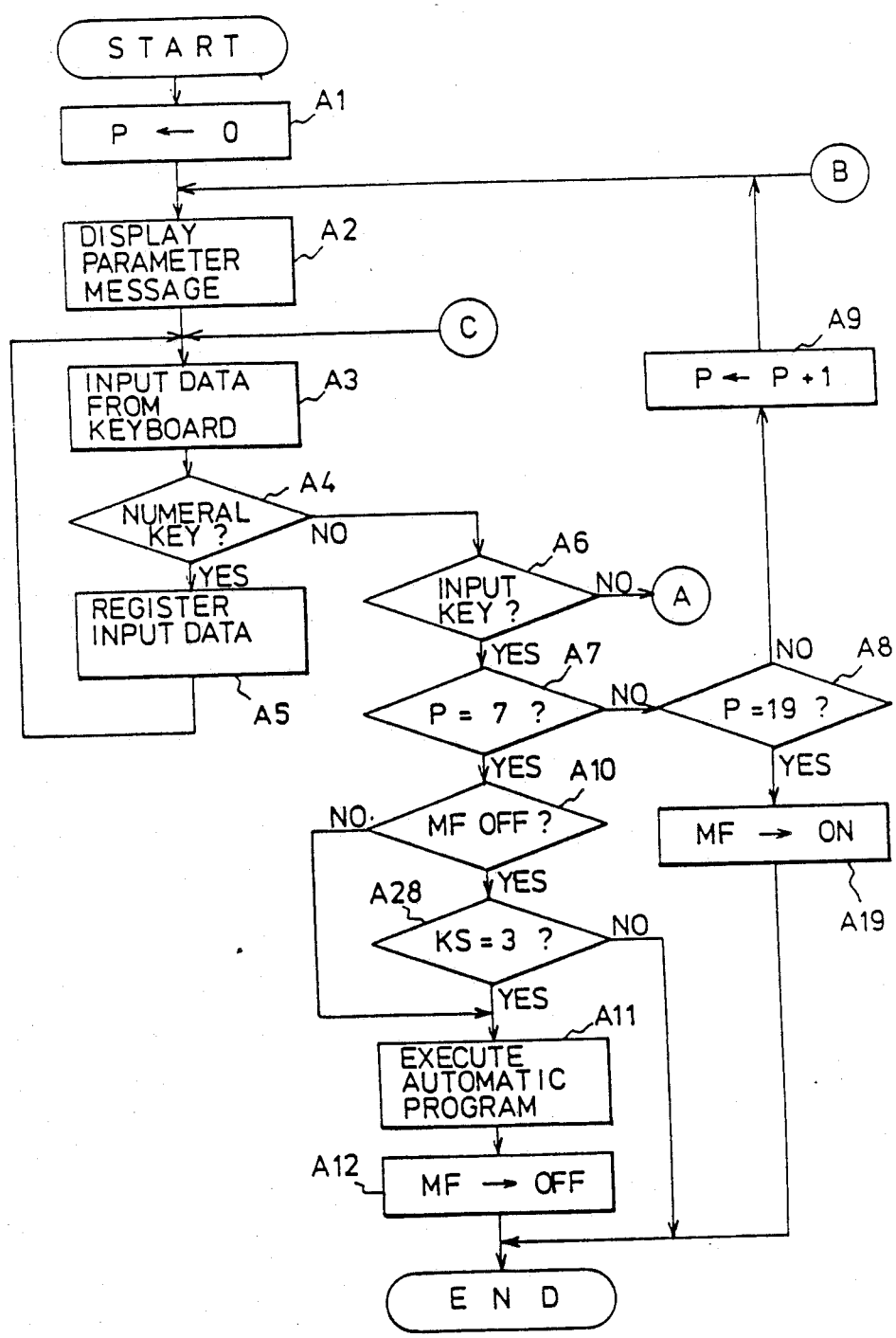
FIGS. 2(a) and 2(b) are both halves of a flow chart representing an exemplary program for executing operation of the device of FIG. 1.
Figure 2B:
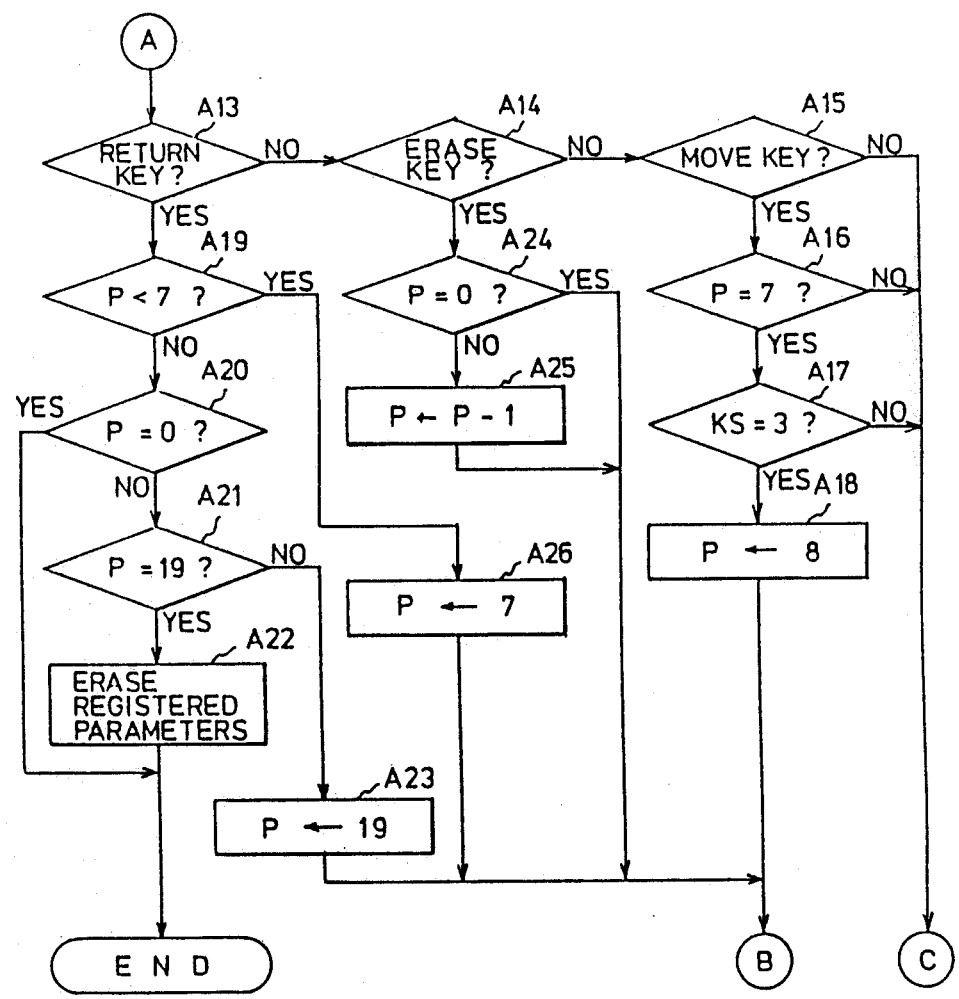

When the key switch 24 is in position 1 in this embodiment, the CPU 4 executes a program as shown in a flow chart of FIGS. 2(a) and 2(b). In this case, it is assumed that CPU 4 includes a parameter counter (hereinunder referred to as "P-counter") which gives the number P of each operational parameter of Table 1 and that CPU 4 also includes a manual operation indicating flag (hereinunder referred to as "MF-flag") which is originally set "ON".

In FIGS. 2(a) and 2(b), Count P of the P-counter is first reset to "0" (step A1). Then, a corresponding parameter message, namely "TARGET WEIGHT", is displayed on a display screen of the display unit 12 (step A2). Then, the numeral keys 16 of the input keyboard 14 are operated to input a desired target weight value (e.g., 100 g) (step A3). In the next step A4, it is inquired whether the key now operated is the numeral key or not. As the answer is now YES, the input target weight value is registered in the read/write memory 6 (step A5) and the step returns to A3. The input key 18 of the keyboard 14 is then pushed. This results in an answer NO in the next step A4 and the step moves to A6 in which it is inquired whether the key now operated is the input key 18 or not. As the answer is now YES, it is further inquired, in the next step A7, whether count P is equal to 7 or not. As the answer is NO, it is inquired, in step A8, whether count P is equal to 19 or not. As the answer is also NO, count P is increased by one (i.e., P=1) in step A9 and the step returns to A2. Accordingly, in step A2, the display unit 12 now displays "SPEED OF OPERATION". Therefore, a desired value (e.g., 50 batches/min.) of speed of operation is input in the next step A3. In the same manner, thereafter, count P is increased by one every time the step A9 is passed, so that the display unit 12 will sequentially display such parameter messages as "SECOND UPPER LIMIT", "CONVEYER AMPLITUDE", "PROGRAM NUMBER", "NOMINAL UNIT WEIGHT" and "NAME OF PRODUCT" every time the step returns to A2. A desired value of each operational parameter is input every time in step A4 and registered in the memory 6 in step A5.

Upon completion of registration of the name of product, however, count P becomes 7 and the display unit 12 displays a "registration message" teaching that operation of input key 18 will result in automatic registration of values of remaining operational parameters, that operation of move key 21 or 22 will enable manual registration of desired values of remaining operational parameters and that operation of return key 20 will erase registered operational parameters. If the input key 18 is pushed for automatic registration, steps A4, A6 and A7 are sequentially executed and step A10 is reached in which it is inquired whether MF-flag is OFF or not. As MF-flag is now left ON, an automatic registration program as described later is executed in step A11 and MF-flag is set OFF in step A12 to finish the registration procedure.

However, if the key switch 24 is put in position 3 and the move key 21 or 22 is pushed when the "registration message" is displayed, the program passes steps A3, A4, A6, A13, A14, A15 and A16 and reaches step A17 in which it is inquired whether the key switch is in position 3 or not. As the answer is YES, count P is increased by one (P becomes 8) in step A18 and the step returns to A2. Accordingly, the display unit 12 then displays "MODE OF OPERATION". In step A3, therefore, a specific mode of operation is input in a predetermined binary code by the numeral keys 16 and, thereafter, the input key 18 is pushed. Then, the program circulates through steps A3, A4, A6, A7, A8, A9 and A2 and, by similar key operations, respective values of first upper limit, lower limit, conveyer operation time, gate opening times of feed, weigh and auxiliary hoppers, weight signal stabilization time, target number of weigh hoppers, chute passage time and delivery signal duration are sequentially registered in manual fashion. Finally, count P of the P-counter becomes 19 and the display unit 12 displays a "final message" teaching that registration of operational parameters are completed and that all the registered parameters will be erased by pushing the return key 20. If the input key 18 is pushed here in accordance with this teaching, the steps are executed through A3, A4, A6, A7 and A8 to A19 in which MF-flag is set ON to finish the manual registration operation. If the return key 20 is pushed instead, the steps are executed through A3, A4, A6, A13, A19, A20 and A21 to A22 in which all the registered parameters are erased. It will be understood that this is also the case if the return key 20 is pushed when a "registration message" is displayed or when P=7.

If the erase key E is pushed when an operation parameter message having the value of P not less than 7 is displayed, the steps are executed through A3, A4, A6, A13, A14 and A24 to A25 in which count P is reduced by one and the step returns to A2. Accordingly, the directly preceding operational parameter is displayed and it becomes possible to change the value of this parameter by operating the numeral keys 16.

If the return key 20 is pushed when an operation parameter whose P is less than 7 is displayed, the steps are executed through A3, A4, A6, A13 and A19 to A26 in which count P is changed into 7 and the step returns to A2 to display a "registration message". Accordingly, it is possible to restore the message display-state with no need of operation of the input key 18 after modifying part of the manually registered parameters.

After all the operational parameters are manually registered as above, if such operational condition becomes of no use, it is possible to simply restore the state of automatic registration as follows. If the key switch 24 is put in position 3 and the input key 18 is pushed after the state of display of the "registration message" is restored as described above, the steps are executed through A3, A4, A6, A7, A10 and A28 to A11 in which the automatic registration program is executed since MF-flag is in the OFF state.

Figure 3:
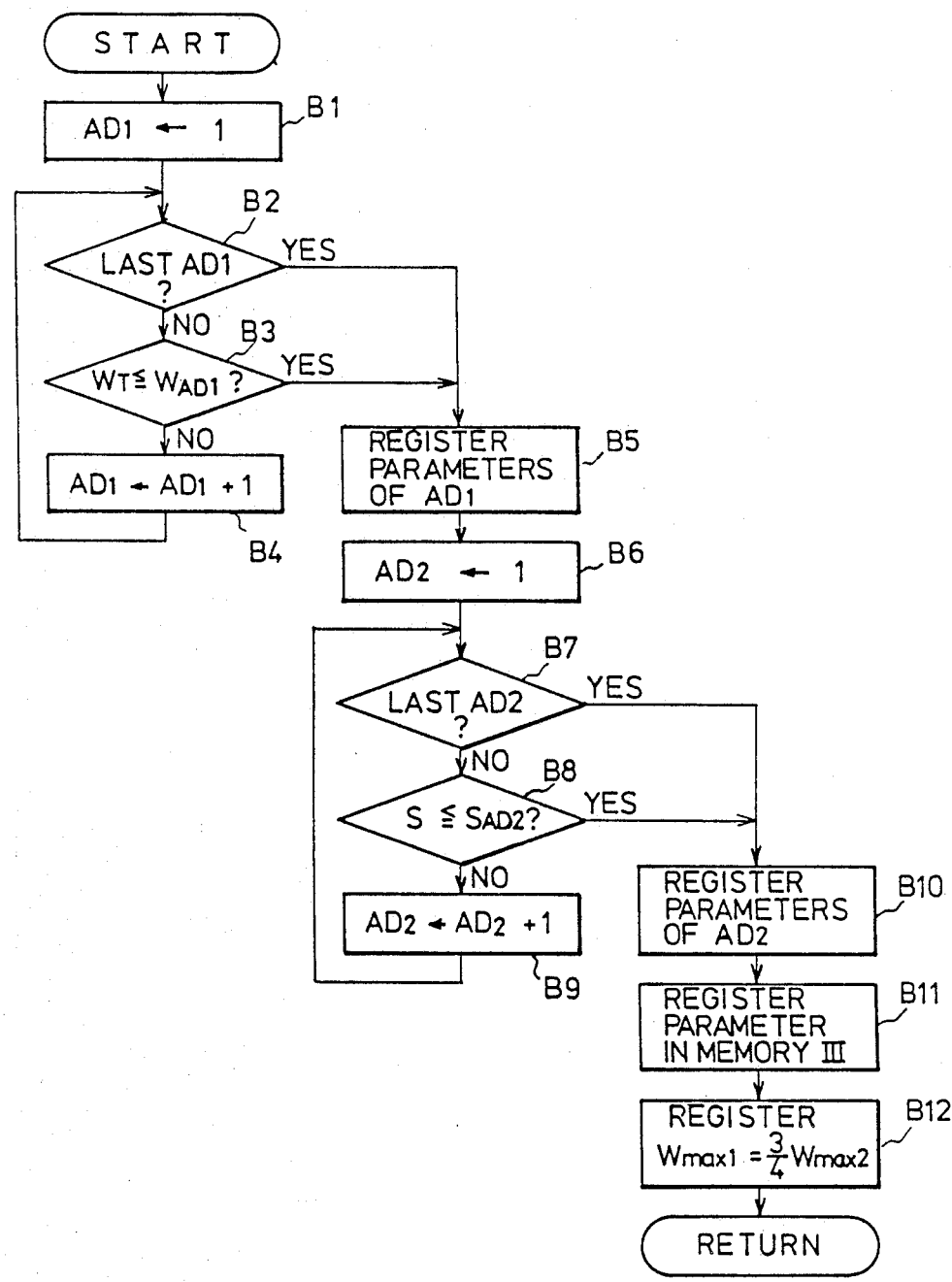
FIG. 3 is a flow chart representing an automatic setting program in the flow chart of FIG. 2.

Now, the description will be made about the above-mentioned automatic registration program with reference to the flow chart of FIG. 3. For this purpose, it is assumed that the CPU 4 includes two address counters (hereinunder referred to as "AD1-counter" and "AD2-counter") for respectively counting address numbers AD1 and AD2 of the first and second data table memories which store the data of Tables 2 and 3, respectively.

The AD1 counter is first set to "1" (step B1) and it is inquired whether the corresponding data is the last one or not (step B2). More particularly, it is inquired whether the target weight of the corresponding address is 000.0 g or not. As the answer is NO, it is inquired whether the registered target weight W is equal to or less than the target weight $W_{AD1}$ of the corresponding address or not (step B3). If the answer is NO, the count of AD1-counter is increased by one (step B4) and the step return to B2. If the answer of step B2 or B3 becomes YES after repeating the same procedure, respective data, that is, the values of gate opening times of weigh, feed and auxiliary hoppers, weight signal stabilization time and conveyer operation time of the corresponding address are read out from the memory 8 and stored in the read/write memory 6. More specifically, for example, the data of AD1=1 are registered if the registered target weight is not greater than 30.0 g and the data of AD1=2 are registered if it is between 30.0 g and 50.0 g. If the registered target weight exceeds 500.0 g, the data of AD1=6 are registered.

Then, the AD2-counter is set to "1" (step B6) and it is inquired whether the corresponding data is the last one, or not (step B7). More particularly, it is inquired whether the speed of operation of the corresponding address is 00.0 batch/min. or not. As the answer is NO, it is inquired whether the registered speed of operation S is equal to or less than the speed of operation $S_{AD2}$ of the corresponding address or not (step B8). If the answer is NO, the count of AD2-counter is increased by one (step B9) and the step returns to B7. If the answer of step B7 or B8 becomes YES after repeating the same procedure, the target number of weigh hoppers of the corresponding address is read out from the memory 9 and stored in the read/write memory 6 in step B10. More specifically, for example, the number of weigh hoppers will be 5.0 if the registered speed of operation is not greater than 40.0 batches/min. and it will be 4.0 if the latter is between 40.0 batches/min. and 50.0 batches/min.. If the registered speed of operation exceeds 60.0 batches/min., the target number of weigh hoppers will be 3.0.

Finally, the content of the third data table memory 10 as shown in Table 4, namely, the values of chute passage time, delivery signal duration and lower limit and the binary code indicative of mode of operation are read out and stored in the read/write memory 6 (step B11). Thereafter, ¾ times the registered second upper limit $W_{max2}$ is stored in the memory 6 as the first upper limit $W_{Max1}$ (step B12) and the step returns to the original program. Thus, the values of operational parameters depending upon the target weight and speed of operation are registered automatically.

Figure 4:
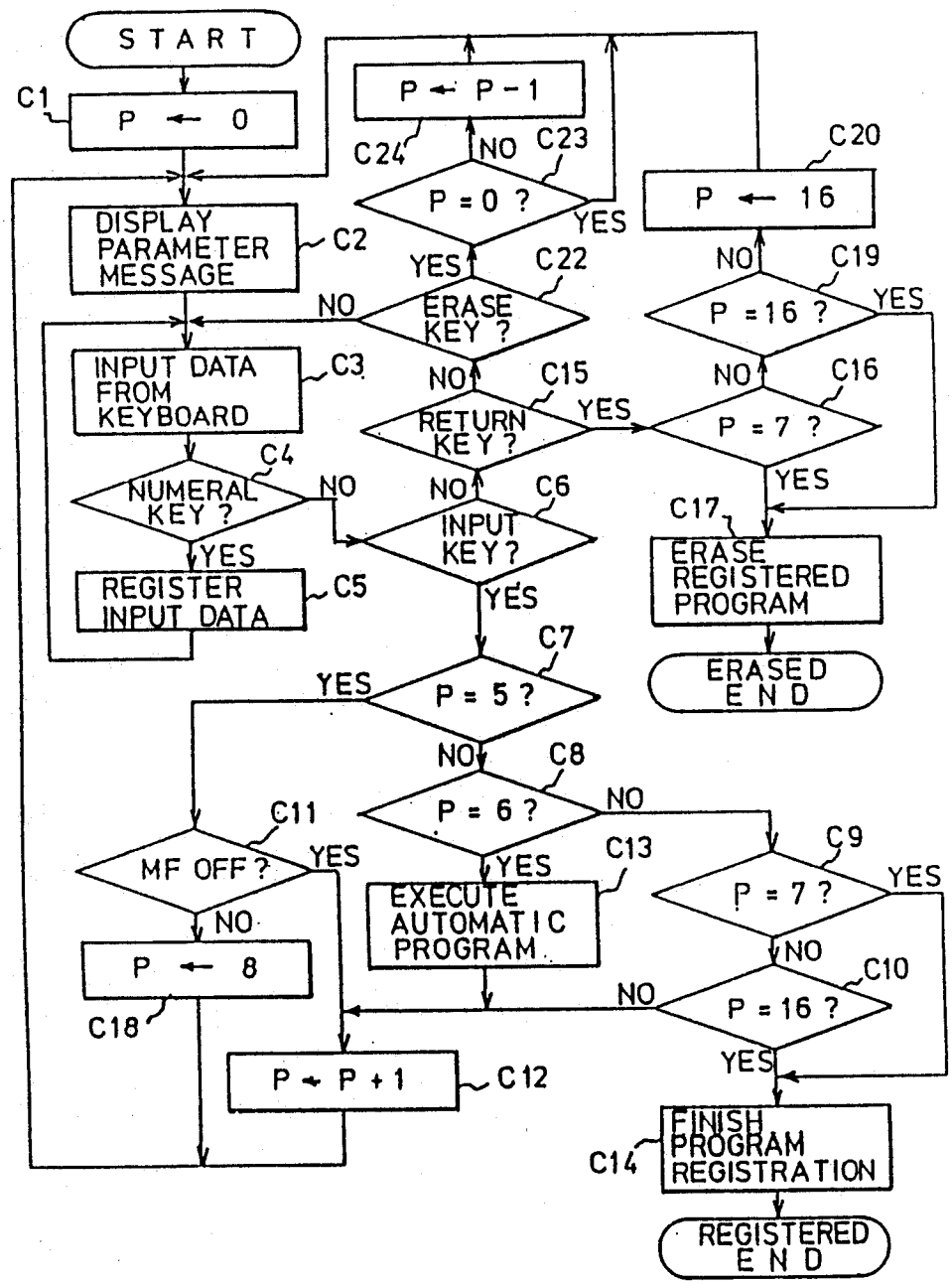
FIG. 4 is a flow chart representing an exemplary program for operation in a second embodiment of the device according to this invention.

While the embodiment of FIG. 1 is adapted for previously storing different combinations of operational parameters as separate programs in the non-volatile memory and values of the respective parameters in the three data table memories 8, 9 and 10 and separately reading one of the programs and corresponding parameter values to register an operational condition, it is also possible to arbitrarily prepare a desired program or operational condition by interpolation based upon some reference programs which are previously stored in non-volatile memory 2 as combinations of operational parameters having fixed values. If such a new program is registered again in the non-volatile memory 2, the data table memories 8, 9 and 10 of FIG. 1 will become unnecessary. Operation of a second embodiment according to this idea will be described below with reference to the flow chart of FIG. 4. In this embodiment, it is assumed that the non-volatile memory 2 previously stores three reference target weights $W_1$, $W_2$ and $W_3$ (where $W_1 < W_2 < W_3$) and operational parameter values depending thereupon as three reference programs and a program corresponding to any intervening target weight is calculated by interpolation as described later. In this case, each operational parameter is provided with a reference number P as shown in Table 5. In this table, "PROGRAM NUMBER" means a reference number arbitrarily given to the new program prepared by interpolation.

TABLE 5

| P | Operational parameters |
|---|---|
| 0 | Program number |
| 1 | Normal unit weight |
| 2 | Name of product |

TABLE 5-continued

| P | Operational parameters |
|---|---|
| 3 | Target weight ($W_T$) |
| 4 | Mode of operation |
| 5 | Programming mode selection |
| 6 | Speed of operation |
| 7 | Automatic program completed |
| 8 | First upper limit ($W_{max1}$) |
| 9 | Weigh hopper gate opening time |
| 10 | Feed hopper gate opening time |
| 11 | Weight signal stabilization time |
| 12 | Conveyer operation time |
| 13 | Chute passage time |
| 14 | Delivery signal duration |
| 15 | Second upper limit ($W_{max2}$) |
| 16 | Final message |

The count P of P-counter is first reset to zero (step C1) and a corresponding parameter message, namely, "PROGRAM NUMBER" is displayed on the screen of display unit 12 (step C2). Then, the numeral keys 16 of input keyboard 14 are actuated to input an arbitrary reference number of the program to be registered, for example, "1" (step C3). In the next step C4, it is inquired whether the key now actuated is a numeral key or not. As the answer is now YES, the input program number is registered in the memory 2 (step C5). Then, the step returns to C3 and the input key 18 is pushed. The answer of the next step C4 becomes NO and it is inquired in step C6 whether the key now actuated is input key 18 or not. As the answer is now YES, it is inquired, in the next step C7, whether the count P is five or not. As it, is now zero, steps C8, C9 and C10 are executed and step C12 is reached. In this step, count P is increased by one and the step returns to C2. Therefore, the operational parameter corresponding to P=1, namely, "NOMINAL UNIT WEIGHT" is displayed and, then, its value is input by the numeral keys 16 (step C4). In similar fashion, thereafter, "NAME OF PRODUCT", "TARGET WEIGHT" and "MODE OF OPERATION" are registered and count P becomes five. Then, the display unit 12 displays a message for "programming mode selection", which teaches that the remaining parameters will be registered manually by pushing the numeral key "0" and they will be registered automatically by pushing the numeral key "1". Now, the numeral key "1" is pushed (step C4) and registered (step C5) to set the manual operation flag MF flag in the IFF state and the step returns to C3. Then, the input key 18 is pushed (step C4) and steps C6, C7, C11 and C12 are executed, thereby increasing count P to six and returning to step C2. Accordingly, the display unit 12 displays "SPEED OF OPERATION" and a desired value of this speed is input by the numeral keys 16. And, if the input key 18 is pushed, steps C4, C6, C7 and C8 are executed to reach step C13 in which an automatic registration program which will be described later is executed. Upon completion of automatic registration, count P becomes seven (step C12) and the display unit 12 displays "AUTOMATIC PROGRAM COMPLETED" (step C2). If the input key 18 is pushed at this time (step C3), steps C4, C6, C7, C8, C9 and C14 are executed and registration of the program No. 1 is ended.

If the return key 20 is then pushed, steps C3, C4, C6, C15, C16 and C17 are executed, so that the program which has been automatically registered is erased.

If the numeral key "0" is pushed (step C3) when the display unit 12 displays "programming mode selection" (step C2) or when P =",5, it is registered to set the manual operation flag MF flag in the ON state. Accordingly, if the input key 18 is then pushed, steps C3, C4, C6, C7, C11 and C18 are executed so that count P becomes eight and the step returns to C2, thereby displaying "FIRST UPPER LIMIT", If the numeral keys 16 are actuated to input parameter values in similar fashion thereafter, steps C3, C4, C6, C7, C8, C9, C10, C12 and C2 are circulated to enable manual registration of respective parameter values. Although the speed of operation corresponding to P=6 is left out and not registered, its registration is unnecessary when the weight signal stabilization time is manually registered since the speed of operation is only needed for calculation of this stabilization time as described later.

Upon completion of this manual registration of the operational parameters, count P becomes sixteen (16) and the display unit 12 displays a "final message" teaching that registration will be completed by pushing the input key 18 and the registered program will be erased by pushing the return key 20. More particularly, if the input key 18 is pushed, steps C3, C4, C6, C7, C8, C9, C10 and C14 are executed to complete registration and, if the return key 20 is pushed, steps C3, C4, C6, C15, C16, C19 and C17 are executed to erase the registered program.

If the return key 20 is pushed on the way of manual registration of the parameters, steps C3, C4, C6, C15, C16, C19 and C20 are executed to convert count, P into sixteen (16) and return the step to C2, so that the display unit 12 displays the "final message". This procedure saves much key operation and is convenient in case of modifying part of the registered parameters.

If the erase key E is pushed on the way of registration, steps C3, C4, C6, C15, C22, C23 and C24 are executed to reduce count P by one and return the step to C2. Accordingly, the display unit 12 displays the directly preceding parameter and enables modification of the value thereof, unless count P is zero. When Count p is zero, or when "PROGRAM NUMBER" is displayed, step 24 is skipped over and the indication is unchanged.

Now, the above-mentioned interpolation will be described with reference to the relation between the above-mentioned reference target weights $W_1$, $W_2$ and $W_3$ and registered target weight $W_T$. Values of a specific operational parameter corresponding to these target weights $W_1$, $W_2$, $W_3$ and $W_T$ will be assumed as $T_1$, $T_2$, $T_3$ and $T_T$.

In a first method which is used for calculating the weigh and feed hopper gate opening times, chute passage time and delivery signal duration, the value of $T_T$ is calculated as follows:

$T_T = T_1$, when $W_T < W_1$;
$T_T = T_1 + (T_2 - T_1)(W_T - W_1)/(W_2 - W_1)$, when $W_1 \leq W_T \leq W_2$;
$T_T = T_2 + (T_3 - T_2)(W_T - W_2)/(W_3 - W_2)$, when $W_2 \leq W_T \leq W_3$ and, when $W_3 < W_T$, an alarm is displayed to request for change of the target weight $T_T$ without calculation of the value thereof. A second method which is used for calculating the conveyer operation time is the same as the first method except that $T_T$ is calculated as follows when $W_T < W_1$.

$T_T = t + (T_1 - t)W_T/W_1$ where t is a fixed time determined experientially and it is assumed, for example, that t = 100 milliseconds when $W_1 > 100$ milliseconds. In a third method which is used for calculating the first and second upper limits and conveyer amplitude, $T_T$ is simply assumed as follows.

$T_T = T_1$, when $W_T \leq W_1$;
$T_T = T_2$, when $W_1 < W_T \leq W_2$;
$T_T = T_3$, when $W_2 < W_T \leq W_3$ and, when $W_3 < W_T$, an alarm is displayed to request for change of the target weight $W_T$ without calculation of the value thereof. The weight signal stabilization time is calculated by dividing one minute by the speed of operation to obtain a delivery interval of successive batches and subtracting therefrom the time needed for combination operation.

Figure 5:
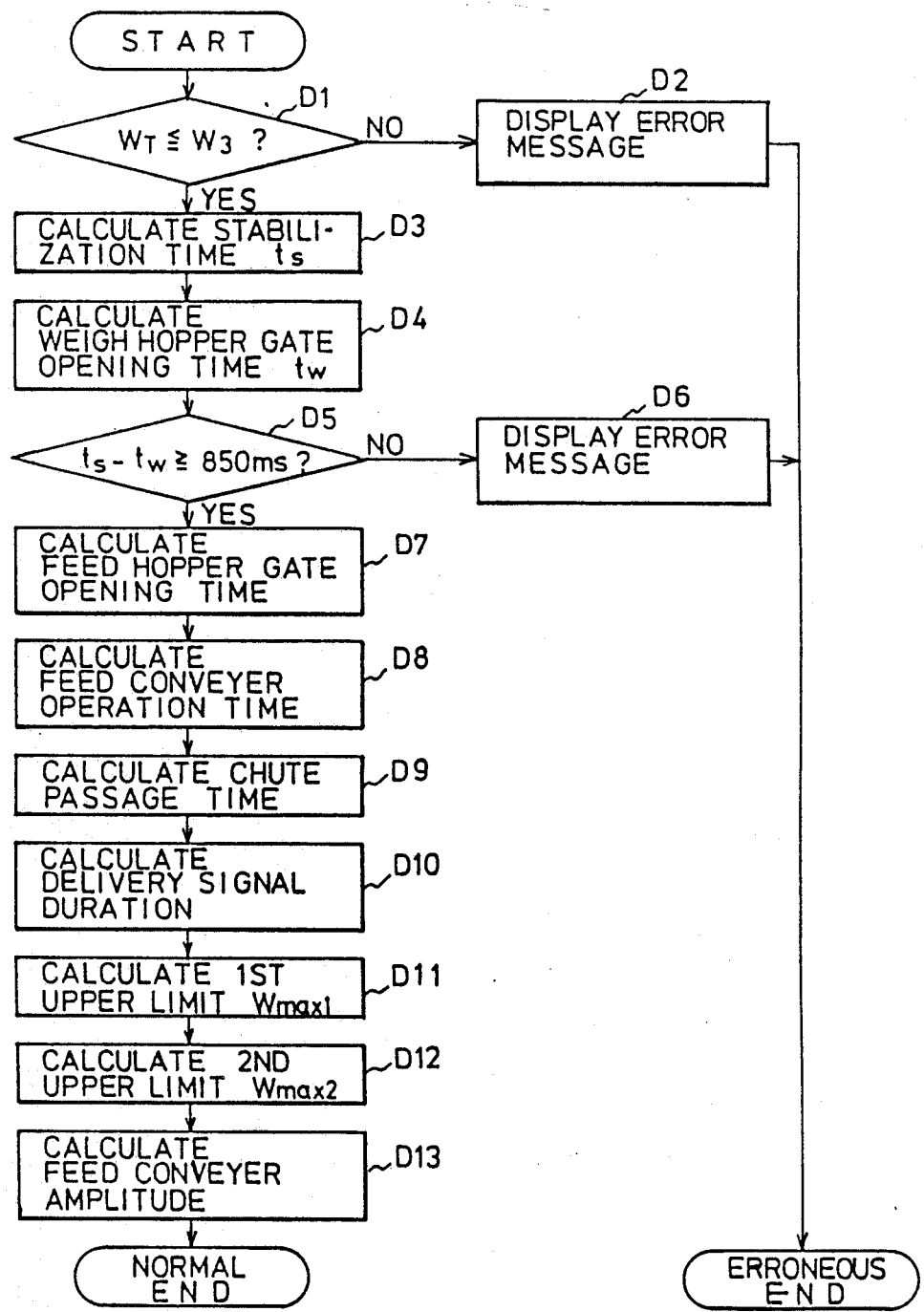
FIG. 5 is a flow chart representing an automatic setting program in the flow chart of FIG. 4.

An automatic operation program for this operational parameter calculation will be described with reference to FIG. 5. It is first inquired whether the registered target weight $W_T$ is equal to or less than the maximum reference target weight $W_3$ or not (step D1). If the answer is NO, an error message is displayed to request for change of the target weight (step D2) and, if it is YES, the weight signal stabilization time $t_s$ is calculated by the above method (step D3) and the weigh hopper gate opening time $t_w$ is also calculated (step D4). Then, the difference between $t_s$ and $t_w$ is calculated and it is inquired whether this difference is equal to or greater than 850 milliseconds or not (step D5). If the answer is NO, an error message is displayed to request for change of the speed of operation (step D6), since it is regarded as too high. However, the value of 850 milliseconds is an example and this value is experientially determined for the type of combination weighing machine. If the answer is YES, the feed hopper gate opening time is calculated by the above method (step D7) and the feed conveyer operation time is also calculated (step D8). Thereafter, the chute passage time (step D9), delivery signal duration (step D10), first upper limit (step D11), second upper limit (D12) and feed conveyer amplitude (step D13) are sequentially calculated in similar fashion.

Figure 6A:
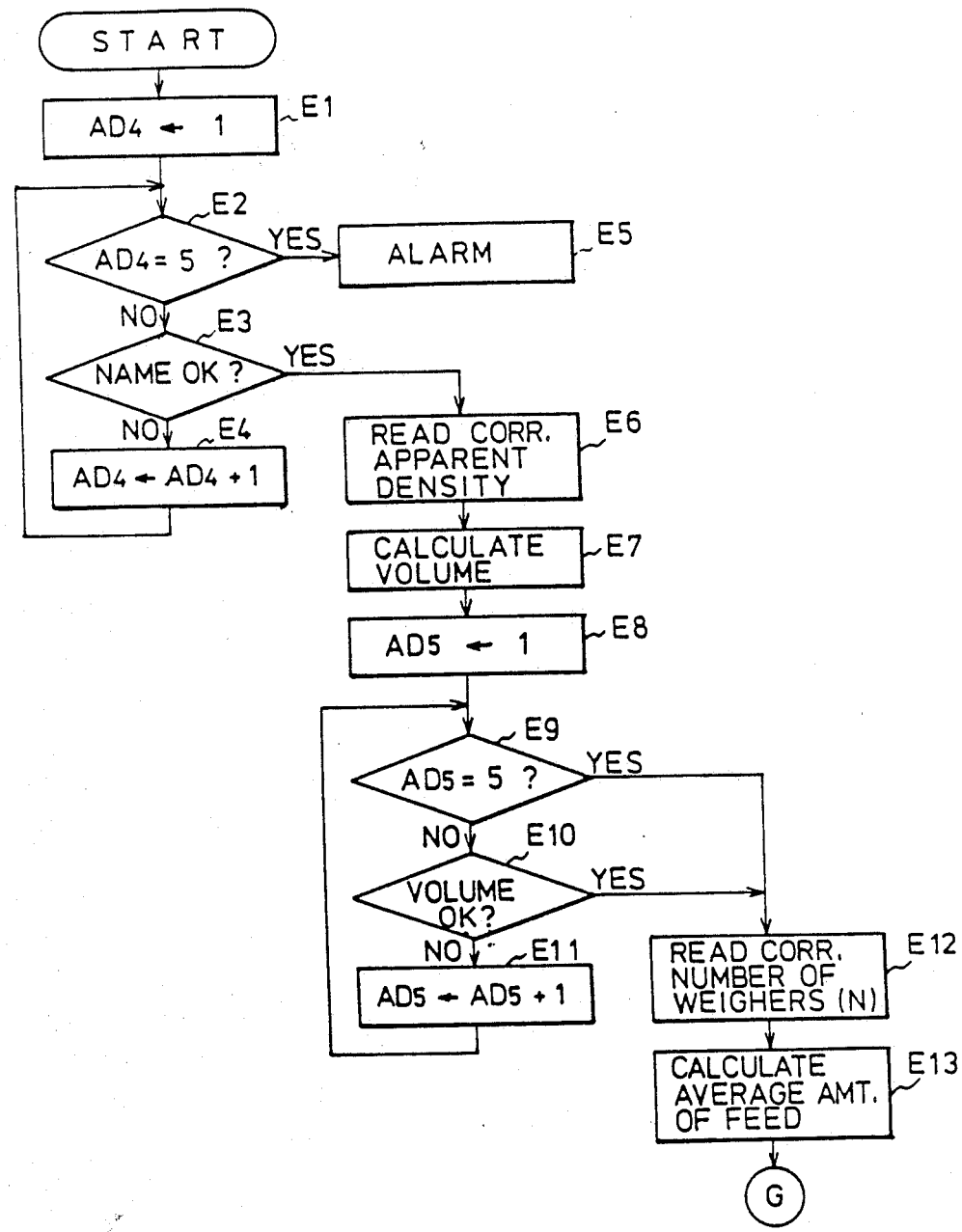
FIGS. 6(a) and 6(b) are both halves of a flow chart representing a further exemplary program for operating the device of this invention.
Figure 6B:
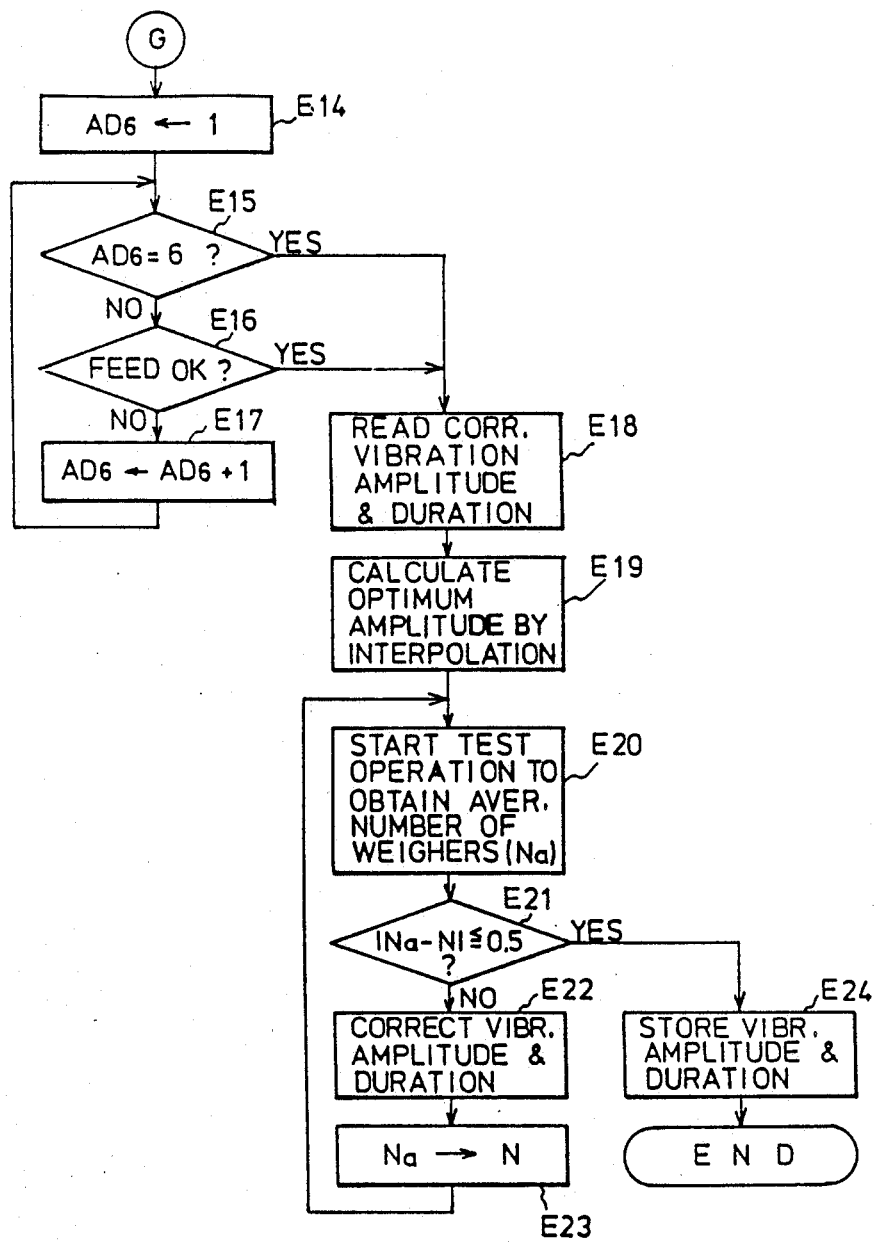

While the embodiment of FIG. 1 includes three data table memories 8, 9 and 10, it may further include fourth, fifth and sixth data table memories for respectively storing various names of product and corresponding apparent densities, various volumes of delivered batch and corresponding number of weigh hoppers, and various average amounts of feed and corresponding feed conveyer operation time and amplitude. The conveyer operation time is removed from Table 2. Operation of this third embodiment will be described below, assuming the numbers of effective addresses in the additional data table memories as four, five and six. The operation of this embodiment is same as that of the first embodiment, except that a program represented by the flow chart of FIGS. 6(a) and 6(b) is executed upon completion of the program of FIG. 3 in case of automatic registration. It is also assumed that the values of batch volume and amount of feed in the fifth and sixth data table memories are arranged in ascending order together with their address numbers.

The address number AD4 of the fourth data table memory is set to one (step E1) and it is inquired whether this address is the fifth address or not (step E2). As the answer is now NO, it is then inquired whether the name of product stored in this address coincides with the registered name of product or not (step E3). If not, the address number is increased by one in the next step E4 and the step returns to E2. If coincidence is obtained in step E3 during repetition of similar operation, step E6 is then executed but, if it is not obtained in the effective address, an alarm is displayed to request change of the registered name of product (step E5).

In step E6, an apparent density is read out from the same address and the target weight $W_T$ is divided thereby to calculate a corresponding batch volume (step E7). Then, the address number AD5 of the fifth data table memory is set to one (step E8) and it is inquired whether this address is the last address or not (step E9). As the answer is now NO, it is then inquired whether the batch volume in the same address is greater than the above calculated batch volume or not (step E10). If NO, the address number is increased by one in the next step E11 and the same operation is repeated. When the answer of step E9 or E10 becomes YES, the number N of weigh hoppers in the same address is read out (step E12) and the above calculated batch volume is divided by this N to calculate an average amount of feed (step E13).

Then, the address number AD6 of the sixth data table memory is set to one (step E14) and it is inquired whether this address is the last address or not (step E15). As the answer is now NO, it is then inquired whether the average amount of feed in the same address is greater than the above calculated average amount of feed or not (step E16). If NO, the address number is increased by one in the next step E17 and the same operation is repeated. When the answer of step E15 or E16 becomes YES, the conveyer amplitude and operation time are read out from the same address (step E18) and the conveyer amplitude is corrected with respect to the above calculated average amount of feed by interpolation using the following equation (step E19):

$$A = A_{m-1} + (Q - Q_{m-1})(A_m - A_{m-1})/(Q_m - Q_{m-1})$$

where $Q_m$ and $A_m$ are amount of feed and conveyer amplitude corresponding to the address number m at the time the answer of step E16 becomes YES, $Q_{m-1}$ and $A_{m-1}$ are amount of feed and conveyer amplitude corresponding to the preceding address number $m-1$, Q is the above calculated average amount of feed and A is the corrected conveyer amplitude as requested. The conveyer operation time may be corrected instead in the same fashion, or the both may be corrected.

In the next step E20, the combination weighing machine is operated in trial with the registered operational condition to obtain the average number Na of weigh hoppers which form each combination when the target weight is attained. Then, the difference between this number of hoppers Na and the number of hoppers N read out in step E12 is calculated and it is inquired whether this difference is equal to or less than 0.5 or not (step E21). If NO, the conveyer amplitude or operation time is corrected by multiplying it by Na/N (step E22) and the same operation is repeated with Na substituted for N (step E23). If the answer of step E21 becomes YES in the meantime, the current conveyer amplitude and operation time are stored (step E24) to complete the automatic registration.

What is claimed is:

1. An operational condition setting device for a combination weighing machine whose operation is controlled with values of independent operational parameters which define an operating condition of the machine and which are registered independently and values of dependent operational parameters which are determined from said values of independent operational parameters, said device comprising means for inputting said values of independent operational parameters, first memory means for storing said input values of independent operational parameters, means for calculating values of dependent operational parameters from said stored input values, and means for registering said calculated values of dependent operational parameters.

2. An operational condition setting device, as set forth in claim 1, wherein said means for registering the values of dependent operational parameters comprises second memory for storing values of said dependent operational parameters corresponding to various values of said independent operational parameters, and means for reading said values of dependent operational parameters corresponding to said values of independent operational parameters stored in said first memory means from said second memory means.

3. An operational condition setting device, as set forth in claim 1, wherein said means for registering the values of dependent operational parameters comprises third memory means for storing various values of said independent operational parameters and corresponding values of said independent operational parameters, and means for calculating said values of dependent operational parameters to be registered corresponding to said values of independent operational parameters from said values of independent operational parameters stored in said first memory means and said values of independent operational parameters and dependent operational parameters.

4. An operational condition setting device, as set forth in claim 1, wherein said means for registering the values of dependent operational parameters comprises means for calculating a value of intermediate parameter from a value of said independent operational parameter stored in said first memory means and a value of apparent density of product to be weighted, fourth memory means for storing values of said dependent operational parameters corresponding to various values of said intermediate parameter, and means for reading from said fourth memory means a value of said dependent operational parameter corresponding to said calculated value of intermediate parameter.

5. An operational condition setting device, as set forth in claim 4, wherein said independent operational parameter stored in said first memory means is target weight, said intermediate parameter is target volume of the product to be weighed in each weigh hopper of said combination weighing machine, and said dependent operational parameter is amount of feed of a feeding device for feeding the product to be weighed to each said weight hopper.

6. An operational condition setting device for a combination weighing machine controlled by independent and dependent parameter data, the device comprising:
   first means for storing independent parameter data;
   means for entering independent parameter data into said first means, the independent parameter data representing various operational conditions of the combination machine;
   second means for storing a table of preset ranges of independent parameter data and a set of dependent parameter data corresponding to each preset range and representing various operating conditions; and
   means for determining the preset range within which the independent parameter data stored in the first means is located, and including means for reading into the combination weighing machine the independent parameter data stored in the first means and the set of dependent parameter data stored in the second means which corresponds to the determined preset range.

7. The device of claim 6 wherein said second means comprises a data table memory of independent and dependent parameter data, the independent parameter data having a predetermined correspondence with the dependent parameter data, and wherein said determining means includes a CPU adapted to determine the lowest stored value of independent parameter data in said data table memory which is equal to or greater than the entered independent parameter data stored in the first means, and means for providing the independent parameter data stored in the first means and the dependent parameter data corresponding to the determined lowest stored value of independent parameter data to the combination weighing machine.

8. The device of claim 7 wherein said second means further comprises an address number associated with each of the independent parameter data and its corresponding dependent parameter data, and the CPU further includes an address counter for counting the address numbers of the second storage means as each value of independent parameter data is sequentially read from least to greatest until the CPU determines that the independent parameter data stored in the first means is equal to or greater than the read value of independent parameter data and wherein the CPU provides to the combination weighing machine the dependent parameter data which has the same address number of the determined value of independent parameter data.

9. The device of claim 6 wherein the preset ranges of independent parameter data is a target weight and its corresponding dependent parameter data are a gate opening time, a weight signal stabilization time, and a conveyer operation time.

10. The device of claim 9 further comprising a third means for storing a table of a second set of dependent parameter data, said determining means reading the second set from the third means and providing it to the combination weighing machine after the independent parameter data stored in the first means and the dependent parameter data corresponding to the determined greatest stored value of independent parameter data are provided by said determining means to the combination weighing machine.

11. The device of claim 10 wherein the dependent parameter data stored in the third storage means are a chute passage time, a delivery signal duration, a lower limit, and a mode of operation.

12. An operational condition setting device for a combination weighing machine whose operation is controlled with values of independent operational parameters which define an operating condition of the machine and which are registered independently and values of dependent operational parameters which are determined from said values of independent operational parameters, said device comprising: means for inputting said values of independent operational parameters, first memory means for storing said input values of independent operational parameters, means for determining values of dependent operational parameters from said stored input values; and means for registering said determined values of dependent operational parameters, said means for registering the values of dependent operational parameters including second memory means for storing values of said dependent operational parameters corresponding to various values of said independent operational parameters, and means for reading from said second memory means said values of dependent operational parameters corresponding to said values of independent operational parameters stored in said first memory means.

13. An operational condition setting device, as set forth in claim 12, characterized in that said means for registering the values of dependent operational parameters includes third memory means for storing various values of said independent operational parameters and corresponding values of said dependent operational parameters, and means for calculating said values of dependent operational parameters to be registered corresponding to said values of independent operational parameters from said values of independent operational parameters stored in said first memory means and said values of independent operational parameters and dependent operational parameters.

14. An operational condition setting device, as set forth in claim 12, wherein said means for registering the values of dependent operational parameters comprises means for calculating a value of intermediate parameter from a value of said independent operational parameter stored in said first memory means, fourth memory means for storing values of said dependent operational parameters corresponding to various values of said intermediate parameter, and means for reading from said fourth memory means a value of said dependent operational parameter corresponding to said calculated value of intermediate parameter.

15. An operational condition setting device, as set forth in claim 14, characterized in that said independent operational parameters stored in said first memory means are target weight and apparent density, said intermediate parameter is target volume of the product to be weighed in each weigh hopper of said combination weighing machine, and said dependent operational parameter is amount of feed of a feeding device for feeding the product to be weighed to each said weigh hopper.

16. An operation condition setting device, as set forth in claim 1, wherein said means for calculating includes means for comparing the calculated values to predetermined reference value ranges and for inhibiting operation of the combination weighing machine when the calculated values are outside the predetermined reference value ranges.

* * * * *